United States Patent Office 3,436,181
Patented Apr. 1, 1969

3,436,181
PROCESS FOR MANUFACTURING
CARBON DISULPHIDE
Jean Berthoux, Decines, Jean-Pierre Quillet, Lyon, and Gerard Schneider, Caluire, France, assignors to Progil, Paris, France, a corporation of France
No Drawing. Filed Dec. 29, 1966, Ser. No. 605,555
Claims priority, application France, Apr. 7, 1966, 47,139; Nov. 11, 1966, 47,948
Int. Cl. C01b 17/20
U.S. Cl. 23—206    6 Claims

ABSTRACT OF THE DISCLOSURE

Process for manufacturing carbon disulphide by the reaction of sulphur with an olefin or diolefin in gaseous phase without a catalyst, the sulphur may be diluted with carbon disulphide and/or hydrogen sulphide and the olefin or diolefin may be diluted with an inert gas.

---

The present invention relates to a new process for manufacturing carbon disulphide by reacting sulphur at high temperature with olefinic or diolefinic hydrocarbons.

The preparation of carbon disulphide by reaction in the gaseous phase of sulphur with aliphatic unsaturated hydrocarbons containing 3 to 4 carbon atoms has already been described in U.S. Patent No. 2,369,377 of December 28, 1940. The reaction is carried out in the presence of a catalyst, which may be a metallic compound deposited on a support such as aluminium oxide or silica, and also a moderating agent, as for example a paraffinic hydrocarbon, $H_2S$ or $CS_2$, for the purpose of increasing the length of life of the catalyst and to reduce the formation of secondary products of high boiling point.

As can be seen according to this patent, the use of a catlyst in this type of reaction starting with an olefin involves the necessity of this latter being diluted with a gaseous "control" agent which is less reactive than the olefin. Although the life of the catalyst could be increased in this way, the phenomena of plugging is not eliminated, since in Example 1 of the aforementioned patent, it was necessary to stop the operation after the reactor had operated for 3½ hours, and in Example 2, the total period of the operations was only 16 hours, without any indication regarding the conversion rate of the olefin, or the purity of the carbon disulphide which is obtained.

It has now been found that a carbon disulphide with a high degree of purity can be obtained with a practically quantitative yield by carrying out the reaction of sulphur with an olefinic or diolefinic hydrocarbon in the absence of any catalyst. Contrary to what could be expected from the results of the well-known reaction of sulphur on paraffinic hydrocarbons higher than $C_2$, it has now been established that, in the process as hereinafter described, no plugging of the apparatus is caused after several tens of hours and even several days of continuous sulphide production and that the formation of carbon-containing secondary products was very small and practically negligible. These advantages, combined with the fact that it is possible to eliminate any catalytic system and to use unsaturated hydrocarbons which are as easily accessible as the conventional starting materials such as methane, underline the technical progress and the economic interest which are inherent in the present process.

According to the process of the invention, unsaturated hydrocarbon and sulphur are caused to react continuously in a gaseous zone at a temperature which is between 550 and 850° C., the reactants being kept in contact for 0.1 to 20 seconds. The sulphur fraction which has not reacted is then condensed and is recycled to the reactor. The carbon disulphide produced is separated from the other gaseous reaction constituents, particularly hydrogen sulphide, using the known techniques of adsorption-desorption, and then it is purified by distillation.

As starting materials, it is possible to use either olefins of low carbon condensation, such as ethylene, propylene, butenes or even their mixtures, such as for example the light olefin cuts obtained as a head fraction at the time of distilling and/or cracking petroleum cuts, or diolefins such as for example butadiene, isoprene, piperylene, etc.

The process does not require any special purity criteria as regards the starting materials and is just as suitable when starting with technical products, such as for example crude distillation products containing a major proportion of olefin and/or diolefin, as when working with hydrocarbons in the pure state.

The adequate temperature can be selected within the aforementioned range. In practice, it is generally preferred to keep the temperature between 600 and 750° C. in order to obtain optimum conversion rates.

The sulphur is heated beforehand to a temperature of at least 550° C. before being brought into contact with the hydrocarbon charge, although this latter can be introduced into the sulphide-forming reactor either at ordinary temperature or after heating up to temperatures of 200° C. or more.

The use of pressures higher than atmospheric pressure is unnecessary in the process according to the invention. Nevertheless, in an industrial installation, it may be advantageous to work under total pressures which may be up to 10 atmospheres.

The respective proportions of sulphur and olefin can be kept close to stoichiometric proportions. However, it has proved advantageous in certain cases to use an excess of sulphur with respect to the quantity theoretically necessary for transforming the hydrocarbon charge into $CS_2$ and $H_2S$. In these cases, the excess is generally between 1 and 50%, but there is actually no upper limit, since the sulphur which has not reacted can be recycled without purification in the sulphidation reactor.

According to a variant of the process of the invention, it is possible to dilute the olefinic hydrocarbon, before introducing it in the sulphidation reactor, with a gas inert under the reaction conditions, such as for example, nitrogen. However, this operating means, which may be very interesting in some cases of commercial manufacturing, does not markedly change the results of the process.

It has moreover been found—and this forms another feature of the process according to the invention—that it is possible to improve the thermal balance of the sulphidation reaction by diluting the sulphur, before it is introduced into the reactor, with a part of the desired final products produced, i.e. the carbon disulphide, the hydrogen sulphide or the mixture thereof. This dilution operation permits the partial pressure of the sulphur to be lowered substantially at its preheating temperature and thus the thermal control of the reaction medium to be improved.

The carbon disulphide and/or hydrogen sulphide used as diluents can originate either from the production of $CS_2$, starting with conventional initial materials, as for example methane, or from the manufacture in accordance with the process of the present invention, starting with olefins or diolefins. In this latter case, it is sufficient continuously to recycle a fraction of the production in the sulphur supply conduit system.

The total volume of the recycling fraction can vary within wide limits and does not constitute a critical factor in this method of carrying out the invention. Nevertheless, it has been established that it is advantageous to use quantities of $CS_2$, of $H_2S$ or of $CS_2$ plus $H_2S$ of the order of 10 to 150 parts (by weight) per 100 parts of sulphur.

In practice, the charge of olefin and sulphur, this latter having undergone a previous heating and having possibly been diluted with $CS_2$ and/or $H_2S$, are continuously sent into a reactor constructed of a corrosion-resistant material, in which the temperature is at least equal to 550° C. The reactor can operate either isothermally—and in this case the indicated temperature is maintained by internal or external heating—or adiabatically, in which case, after the reactants have been brought into contact, the reaction mixture remains in the range of the aforementioned temperatures without supplying other heat. The internal part of the reactor can optionally contain an inert solid material—as for example Raschig rings—designed to assist the contacts between the gaseous reactants. The gaseous effluent, containing essentially S, $H_2S$ and CS, is then directed into a condenser, in which the sulphur which has not reacted is liquefied, and then into coalescing units or scrubbers, in which the gases are freed from the last traces of sulphur. The carbon disulphide is then collected in a condenser and possibly a phase separator. The residual gases, which contain essentially uncondensed $CS_2$ and $H_2S$, can then flow through a series of absorbers and desorbers, in which $H_2S$ is separated, while the recovered $CS_2$ is collected with the first fraction, after the latter has been freed from the sulphur and dissolved $H_2S$.

The following examples show how the process according to the invention can be carried into effect. Unless otherwise indicated, all the parts of reactants or products obtained represent parts by weight.

Example 1

A mixture of 2730 parts of sulphur and 303 parts of propylene are continuously introduced per hour into a tubular sulphidation reactor made of chrome steel, the reactants having been heated beforehand to temperatures of respectively 600° and 200° C. The excess of sulphur with respect to the stoichiometric ratio was in this case 31.5%.

The reactor was kept at a temperature in the region of 700° C. at atmospheric pressure and the residence time of the reactants at this temperature was 2.6 seconds.

Under these conditions 1523 parts of a condensate were collected per hour, the condensate having the following percentage composition:

|  | Percent |
|---|---|
| $CS_2$ | 99.30 |
| $H_2S$ | 0.22 |
| Thiophene | 0.48 |

The conversion rate of the propylene into carbon disulphide, with a purity higher than 99%, was 92%.

The hydrogen sulphide was produced at the time of sulphidation in molar quantities equivalent to the carbon disulphide.

After operating for more than 60 hours, no plugging of the ducts of the apparatus was found and the carbon formation was very low.

Example 2

The same conditions were used as regards temperature, time of contact of the reactants and with a sulphur excess of the same order as in Example 1, except that the propylene was diluted with nitrogen, the proportions being respectively 70% and 30% by volume.

By continuously charging the sulphidation reactor hourly with 2450 parts of sulphur and 289 parts of propylene, diluted with 43% of its volume of nitrogen, there were hourly obtained 1470 parts of condensate with the following percentage composition:

|  | Percent |
|---|---|
| $CS_2$ | 99.08 |
| $H_2S$ | 0.22 |
| Thiophene | 0.70 |

Under these conditions, the conversion rate of olefin into carbon disulphide was 93%.

Example 3

A mixture of 2990 parts of sulphur, preheated to 640° C., and 310 parts of ethylene (at 25° C.) was continuously introduced per hour into the same apparatus as in Example 1 under a pressure of 2 atmospheres. The temperature of the reactor was in the region of 650° C., and the residence time of the reactants was 6.5 seconds (isothermal operation).

After separation of the excess sulphur and condensation of the gaseous effluent, there were thus recovered, per hour, 1587 parts of a liquid titrating 99.9% of $CS_2$. The conversion rate of the ethylene into carbon disulphide, moreover identical with that of the transformation into hydrogen sulphide, was 94.3%.

On stopping the operation after 6 hours of continuous running, it was found that the formation of tarry residues was almost negligible (smaller than 500 parts per million of the weight of sulphur in excess).

Example 4

Industrial manufacture of carbon disulphide was carried out in a refractory brick reactor with a volume of 4 cubic metres, filled with Raschig rings.

A mixture of:

5500 kg. of sulphur, preheated to 700° C. and
655 kg. of technical propylene, not preheated (about 25° C.)

was introduced hourly into the reactor (operating adiabatically).

The olefinic starting material titrated (by weight): 94.2% of propylene, 5% of propane, 0.7% of ethane and 0.1% of ethylene.

The average pressure in the reactor was of the order of 5 atmospheres and the temeprature reached 665° C. at the inlet and 600° C. at the outlet.

The average residence time of the sulphur and olefin in the reactor was approximately 15 seconds.

Under these conditions, there was obtained a production of 3500 kg./hour of $CS_2$ and 1050 cubic metres per hour (at N.T.P.) of $H_2S$. The conversion rate of the propylene was thus practically quantitative.

The carbon disulphide obtained had a purity of 99.99%. It was free from thiophene (less than 1 p.p.m.) and contained 5 to 20 p.p.m. of benzene as the only microscopic trace of impurity.

The excess of sulphur—initially 23% with respect to the stoichiometry—could be recycled, so that almost the total weight of tars (calculated as weight of carbon in the sulphur in excess) was smaller than 500 p.p.m. after 40 hours of continuous operation.

Example 5

This example and the following example illustrate industrial operations in the manufacture of $CS_2$, in which the sulphur was diluted with carbon disulphide and hydrogen sulphide.

The operation took place in the same reactor as in Example 4, with continuous introduction per hour of:

|  | Kg. |
|---|---|
| Technical propylene at 25° C. | 410 |
| Sulphur diluted with 1730 kg. of $CS_2$ | 3100 |
| and $H_2S$ | 1550 |

These sulphur products were mixed in vapor phase and preheated to 650° C.

The excess of sulphur, relative to the quantity stoichiometrically necessary, was 11%.

The temperature in the unheated reactor was 640° C. at the inlet and 610° C. at the outlet, while the internal pressure was close to 5.2 atmospheres. The residence time of the reactants, under the aforementioned conditions, was of the order of 7 seconds.

In this manner, with continuous operation for 18 hours, there was obtained a quantitative production of carbon disulphide with a purity at least equal to 99.99%.

Example 6

A carbon disulphide free from impurities was continuously produced for 13 hours by quantitative transformation of propylene under the following conditions, applied to the same apparatus as in Example 5:

Supply (rate of flow in hours):
    Propylene at 25° C. _____ kg__ 510

Sulphur heated to 660° C. (excess over theoretical: 1%) _____ kg__ 3650
Diluent of the sulphur:
    $CS_2$ _____ kg__ 1930
    $H_2S$ _____ kg__ 1725
Pressure at the inlet to the reactor atmospheres____ 5.8
Temperatures in the reactor (adiabatic operation):
    Inlet _____°C__ 640
    Outlet _____°C__ 610

After this operation, and moreover as after the operation according to Example 5, it was established that there was practically no trace of tarry products in the pipe conduits of the apparatus.

Example 7

A mixture of 152 parts of butadi-1,3-ene which has not been preheated (about 25° C.) and 1500 parts of sulphur preheated to 750° C. are introduced continuously per hour into the same apparatus as in Example 1, under a pressure of 1.3 atmospheres. The temperature of the reactor was kept at 800° C. and the residence time of the reactants was of the order of 3 seconds.

The operation was carried out for 6 hours, practically without any formation of tarry residue, and recovering per hour, after separation of the excess of sulphur and $H_2S$, 770 parts of $CS_2$ titrating 99.99%. The conversion rate in this case was 90%. It was of the same order for the production of $H_2S$.

It will be obvious to those skilled in the art that various changes may be made without departing from the scope of the invention and the invention is not to be considered limited to what is described in the specification.

What is claimed is:
1. In a process for the continuous manufacture of carbon disulphide by reacting, in vapor phase, sulphur, with an unsaturated hydrocarbon, then condensing from the reaction mixtrue the unreacted sulphur which is recycled to the reactor and separating the carbon disulphide product from other gaseous compounds produced, the improvement which comprises bringing into contact sulphur and a hydrocarbon selected from the group consisting of olefins and diolefins of 2–4 carbon atoms, in a sulphidation reactor at temperatures from 550 to 850° C. for 0.1 to 20 seconds in the absence of a caatlytic system.

2. Process according to claim 1, wherein the sulphur and the unsaturated hydrocarbon are preheated to temperatures of respectively 550° C. to 600° C. and 200° C. or more, before they are brought into contact in the sulphidation reactor.

3. Process according to claim 1, wherein the sulphur is preheated to a temperature of at least 550° C. before being brought into contact with the unsaturated hydrocarbon, said unsaturated hydrocarbon being introduced into the sulphidation reactor at normal temperature.

4. Process according to claim 1, wherein the sulphur is diluted, before being brought into contact with the unsaturated hydrocarbon, with carbon disulphide, hydrogen sulphide or a mixture thereof, the ratios by weight of $S/CS_2$, $S/H_2S$ or $S/CS_2+H_2S$ being between 1/0.1 and 1/1.5.

5. Process according to claim 1, wherein the reaction takes place under pressure from atmospheric pressure up to 10 atmospheres.

6. Process according to claim 1, wherein the unsaturated hydrocarbon is diluted with an inert gas before being introduced into the sulphidation reactor.

References Cited

UNITED STATES PATENTS

| | | | |
|---|---|---|---|
| 2,666,690 | 1/1954 | Folkins | 23—206 |
| 2,369,377 | 2/1945 | Thacker | 23—206 |
| 2,392,629 | 1/1946 | Avery et al. | 23—206 |
| 2,424,894 | 7/1947 | Marek | 23—206 |
| 3,082,069 | 3/1963 | Banks | 23—206 |
| 3,250,595 | 5/1966 | Olsen | 23—206 |

FOREIGN PATENTS

| | | |
|---|---|---|
| 584,646 | 10/1959 | Canada. |
| 627,423 | 9/1961 | Canada. |

OSCAR R. VERTIZ, *Primary Examiner.*

G. O. PETERS, *Assistant Examiner.*